(12) United States Patent
Kawachi et al.

(10) Patent No.: US 9,573,436 B2
(45) Date of Patent: Feb. 21, 2017

(54) TORSION BEAM, TORSION BEAM ASSEMBLY, AND TORSION BEAM TYPE SUSPENSION SYSTEM

(71) Applicant: Nippon Steel & Sumitomo Metal Corporation, Tokyo (JP)

(72) Inventors: Takeshi Kawachi, Tokyo (JP); Eisaku Sakurada, Tokyo (JP); Takaaki Fukushi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/764,729

(22) PCT Filed: Jan. 30, 2013

(86) PCT No.: PCT/JP2013/052070
§ 371 (c)(1),
(2) Date: Jul. 30, 2015

(87) PCT Pub. No.: WO2014/118915
PCT Pub. Date: Aug. 7, 2014

(65) Prior Publication Data
US 2015/0352922 A1    Dec. 10, 2015

(51) Int. Cl.
*B60G 3/12* (2006.01)
*B60G 21/05* (2006.01)
*B60B 35/04* (2006.01)

(52) U.S. Cl.
CPC .............. *B60G 21/051* (2013.01); *B60B 35/04* (2013.01); *B60G 2200/21* (2013.01); *B60G 2206/202* (2013.01)

(58) Field of Classification Search
CPC ....... B60G 9/006; B60G 11/18; B60G 11/184; B60G 11/189; B60G 21/051; B60G 21/055; B60G 2200/23
(Continued)

(56) References Cited

U.S. PATENT DOCUMENTS 4,623,164 A * 11/1986 Cassel .................. B60G 21/051
24/20 LS
5,324,073 A * 6/1994 Alatalo ................ B60G 21/051
228/144
(Continued)

FOREIGN PATENT DOCUMENTS

| JP | 2004-314651 | 11/2004 |
| JP | 2005-306177 | 11/2005 |

(Continued)

OTHER PUBLICATIONS

International Search Report dated Mar. 19, 2013 issued in corresponding PCT Application No. PCT/JP2013/052070.

*Primary Examiner* — Toan To
(74) *Attorney, Agent, or Firm* — Birch, Stewart, Kolasch & Birch, LLP

(57) ABSTRACT

A torsion beam which is used in a suspension system of an automobile which is provided with a pair of arm members which extend in a front-rear direction of the automobile and are designed to be connected to a chassis of the automobile so as to be able to swing and to have wheels attached rotably to them is disclosed. The torsion beam is formed with a recess which extends in the longitudinal direction whereby that torsion beam has first and second leg parts in a plane vertical to the longitudinal direction and exhibits a substantially V-shaped or substantially U-shaped cross-sectional shape. The torsion beam is provided with connection parts which are provided at the two ends of that torsion beam and are connected to the arm members, a fixed shape part which is provided at a center part in the longitudinal direction of that torsion beam, and asymmetric shape parts which are provided between that fixed shape part and the connection parts. At the asymmetric shape parts, the depth of the recess becomes gradually deeper from the connection parts toward
(Continued)

the fixed shape part and the first leg part has a larger width dimension than the width dimension of the second leg part.

18 Claims, 11 Drawing Sheets

(58) Field of Classification Search
USPC ..... 280/124.128, 124.149, 124.152, 124.166
See application file for complete search history.

(56) References Cited

U.S. PATENT DOCUMENTS

| | | | | |
|---|---|---|---|---|
| 6,460,869 B1* | 10/2002 | Tremouilles | ......... | B60G 21/051 280/124.116 |
| 6,523,841 B2* | 2/2003 | Glaser | .................. | B60B 35/006 280/124.106 |
| 6,533,300 B1* | 3/2003 | Hicks | .................. | B60G 21/051 280/124.106 |
| 7,946,600 B2* | 5/2011 | Kobayashi | ............. | B60G 13/16 280/124.107 |
| 8,505,939 B2* | 8/2013 | Kim | ..................... | B60G 21/051 280/124.106 |
| 2010/0264614 A1* | 10/2010 | Borgna | ................ | B60G 21/051 280/124.128 |
| 2011/0260423 A1 | 10/2011 | Lepre | | |
| 2013/0093156 A1* | 4/2013 | Buschjohann | ....... | B60G 21/051 280/124.128 |
| 2013/0140785 A1* | 6/2013 | Stranz | ................. | B60G 21/051 280/124.166 |
| 2014/0174610 A1* | 6/2014 | Edahiro | ................... | B60G 9/04 148/565 |
| 2015/0115564 A1* | 4/2015 | Peters | .................... | B21D 47/01 280/124.166 |
| 2016/0068035 A1* | 3/2016 | Rao | ..................... | B60G 21/051 280/124.166 |

FOREIGN PATENT DOCUMENTS

| | | |
|---|---|---|
| JP | 2011-046232 | 3/2011 |
| JP | 2012-505784 | 3/2012 |

* cited by examiner

TORSION BEAM, TORSION BEAM ASSEMBLY, AND TORSION BEAM TYPE SUSPENSION SYSTEM

CROSS REFERENCE TO RELATED APPLICATION(S)

This application is a national stage application of International Application No. PCT/JP2013/052070, filed Jan. 30, 2013, which is incorporated by reference in its entirety.

TECHNICAL FIELD

The present invention relates to a torsion beam type suspension system for an automobile, more particularly relates to a torsion beam which can suppress metal fatigue and to a torsion beam assembly and a torsion beam type suspension system which are provided with that torsion beam.

BACKGROUND ART

As is well known, in the automotive field, torsion beam type suspension systems are being widely used. A torsion beam type suspension system is provided with a left-right pair of arm members and a torsion beam which connects the arm members with each other. The arm members are connected at their base end parts to a chassis to be able to rotate and have wheels attached to their front end parts to be able to rotate. Dampers are attached between the arm members and the chassis. Near the end parts of the torsion beam, spring receiving parts are provided. Between the spring receiving parts and the chassis, coil springs are arranged. A torsion beam is designed to give roll rigidity to the chassis by mainly torsional rigidity of the torsion beam when the chassis receives outside force from a road surface. A torsion beam has a cross-sectional shape which exhibits suitable torsional rigidity in consideration of the roll rigidity of the chassis. That cross-sectional shape is generally formed symmetric in the front-rear direction of the chassis (for example, see PLT 1).

CITATIONS LIST

Patent Literature

PLT 1: Japanese Patent Publication No. 2005-306177A

SUMMARY OF INVENTION

Technical Problem

Due to the external force which is received from a road surface, a torsion beam has a complicated stress profile. Depending on the state of use of a vehicle, sometimes the torsion beam will become susceptible to early metal fatigue. The present invention has as its technical problem to solve this problem in the prior art and has as its object the provision of a torsion beam which is used in a suspension system of an automobile and can efficiently suppress metal fatigue and of a torsion beam assembly and a torsion beam type suspension system which are provided with that torsion beam.

Solution to Problem

The inventors engaged in intensive research on the relationship between the torsional rigidity and stress profile of a torsion beam and as a result discovered that by controlling the relative positions of a vertex of an outside wall part and a vertex of an inside wall part in a cross-sectional shape vertical to the longitudinal direction of the torsion beam, it is possible to maintain the torsional rigidity of the torsion beam constant while changing the stress profile which occurs at the torsion beam as desired.

According to the present invention, there is provided a torsion beam which is used in a suspension system of an automobile which is provided with a pair of arm members which extend in a front-rear direction of the automobile and are designed to be connected at first end parts to a chassis of the automobile so as to be able to swing about pivot shafts in a top-bottom direction and to have wheels attached rotably at second end parts at opposite sides to the end parts which are connected to the chassis of the automobile, wherein the torsion beam has a recess which extends in the longitudinal direction whereby that torsion beam has first and second leg parts in a plane vertical to the longitudinal direction and exhibits a substantially V-shaped or substantially U-shaped cross-sectional shape, the torsion beam is provided with connection parts which are provided at the two ends of that torsion beam and are connected to the arm members, a fixed shape part which is provided at a center part in the longitudinal direction of that torsion beam, and asymmetric shape parts which are provided between that fixed shape part and the connection parts, at the fixed shape part, the recess has a constant depth and the first and second leg parts have generally the same thicknesses or width dimensions, and at the asymmetric shape parts, the depth of the recess becomes gradually deeper from the connection parts toward the fixed shape part and the first leg part has a larger width dimension than the width dimension of the second leg part.

According to the torsion beam according to the present invention, the torsion beam can be controlled in the value of the maximum main stress which occurs at the torsion beam independently from the torsional rigidity of the torsion beam, so the value of the maximum main stress and the rigidity of the torsion beam can be efficiently set. As a result, it is possible to secure the desired suspension performance while reducing the value of the maximum main stress of the torsion beam and effectively reducing the metal fatigue which occurs at the torsion beam.

Advantageous Effects of Invention

According to the torsion beam, torsion beam assembly, and torsion beam type suspension system according to the present invention, it is possible to control the value of the maximum main stress which occurs at the torsion beam independently from the rigidity of the torsion beam and therefore it is possible to efficiently set the value of the maximum main stress and the rigidity of the torsion beam. As a result, the strength of the torsion beam against metal fatigue can be improved and the durability can be enhanced.

DESCRIPTION OF EMBODIMENT

Figure 1:
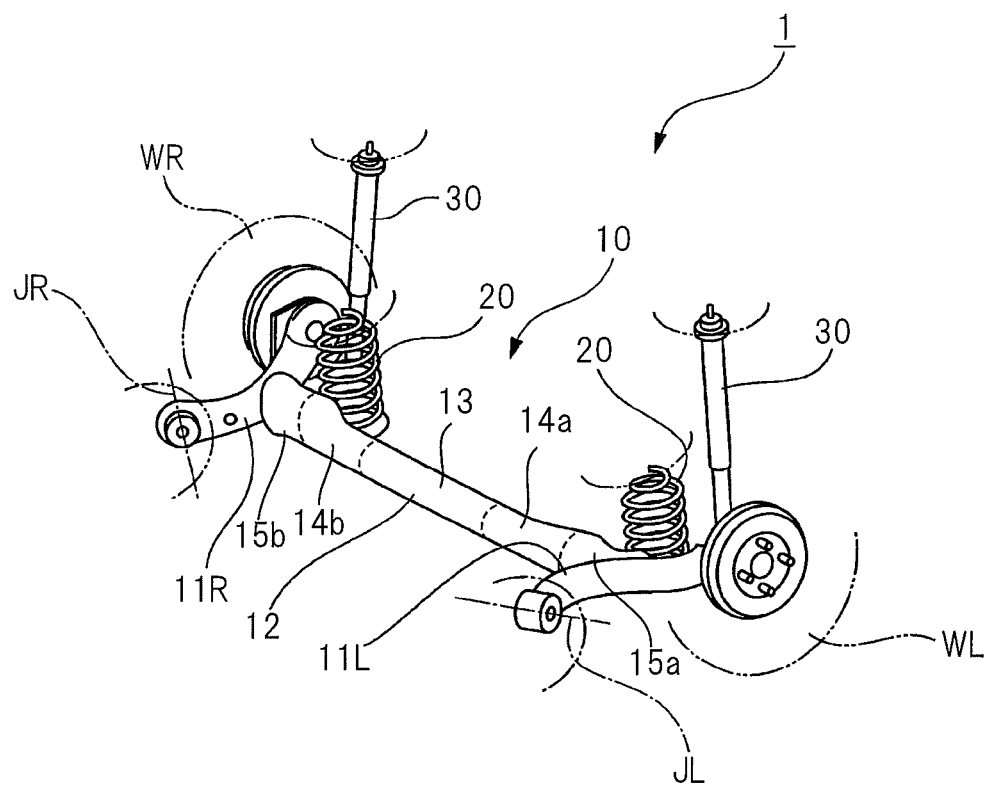
FIG. 1 is a schematic perspective view of a torsion beam type rear suspension system as one example of a suspension system to which the present invention can be applied.
Figure 2:
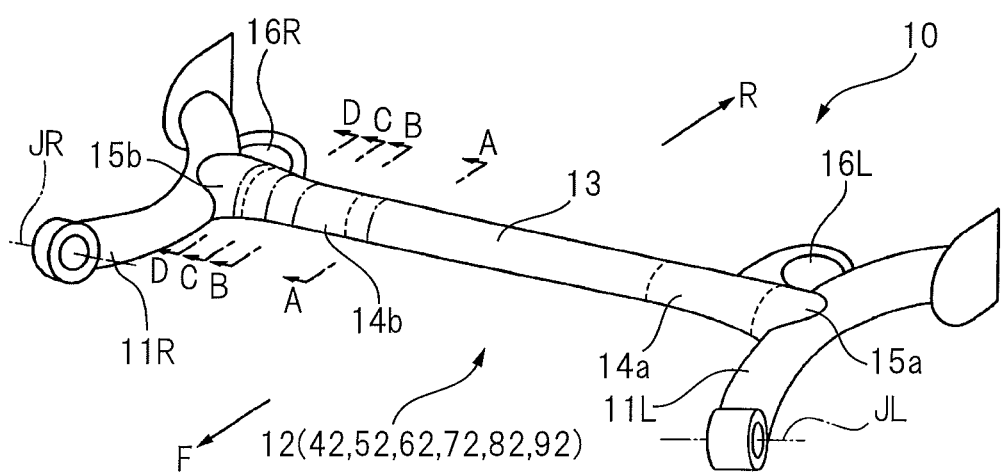
FIG. 2 is a schematic perspective view which shows one example of a torsion beam assembly which is provided with a torsion beam according to the present invention.
Figure 3:
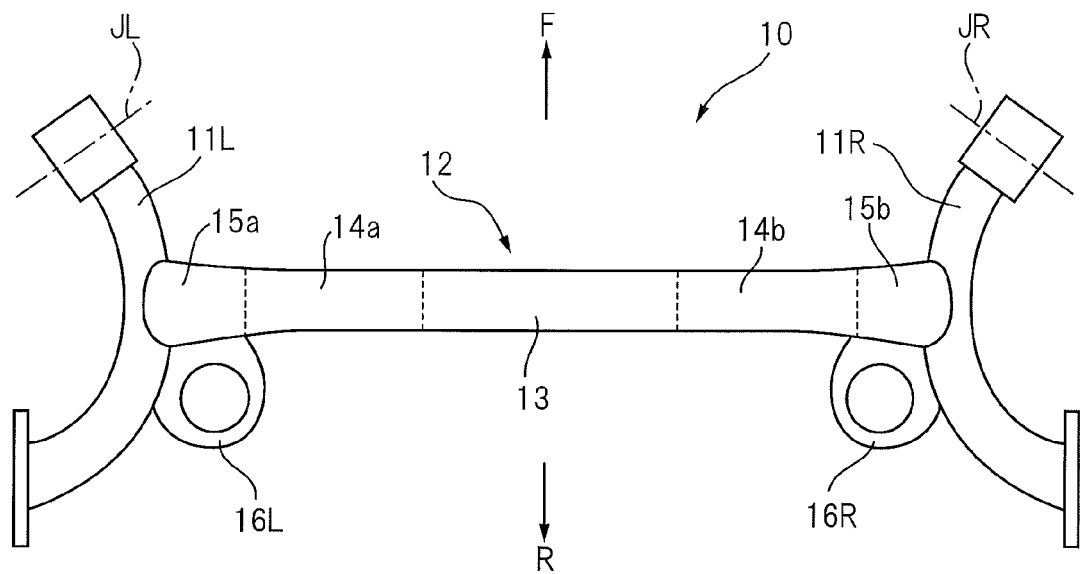
FIG. 3 is a schematic plan view of a torsion beam assembly of FIG. 2.

Below, referring to the attached drawings, a plurality of embodiments of the present invention will be explained. Note that the letters F and R in the figures show the front and rear of the vehicle when attaching the torsion beam to the chassis of an automobile. First, referring to FIG. 1 to FIG. 7, a first embodiment of the present invention will be explained. In FIG. 1, a torsion beam type rear suspension system 1 is provided with a torsion beam assembly 10 and springs 20 and dampers 30 which are arranged between the torsion beam assembly 10 and chassis. The torsion beam assembly 10, as shown in FIGS. 1 and 2, is provided with a left-right pair of arm members constituted by the trailing arms 11L and 11R which extend in the front-rear direction of the automobile when attached to the chassis and a torsion beam 12 which connects the trailing arms 11L and 11R to each other. The torsion beam assembly 10 is further provided with a left-right pair of spring receiving parts 16L and 16R which support the bottom end parts of the springs 20 and damper receiving parts (not shown) which support the bottom end parts of the dampers 30. The trailing arms 11L and 11R are connected at their base end parts to the chassis to be able to swing about the pivot shafts JL and JR in the top-bottom direction or in a vertical plane. At the front end parts of the trailing arms 11L and 11R at the opposite sides to the base end parts, the wheels WL and WR are attached to be able to rotate.

The torsion beam 12 is comprised of a hollow member which extends between the trailing arms 11L and 11R in the left-right direction of the automobile, that is, the width direction. The spring receiving parts 16L and 16R are formed at the opposite sides of the torsion beam 12 from the pivot shafts JL and JR, in the present embodiment, at the rear side of the automobile, and are formed between the trailing arms 11L and 11R and the torsion beam 12, while the damper receiving parts (not shown) are provided on the trailing arms 11L and 11R near the spring receiving parts 16L and 16R.

The torsion beam 12 according to the first embodiment is provided with a fixed shape part 13 which is provided at the substantial center of its longitudinal direction, first and second connection parts 15a and 15b which are connected with trailing arms 11L and 11R which are provided at the two end parts, and first and second asymmetric shape parts 14a and 14b which are provided between the fixed shape part 13 and the first and second connection parts 15a and 15b. The torsion beam 12, as shown in FIG. 3, FIG. 4, and FIG. 5A to FIG. 5D, has a substantially horizontal V- or U-shaped cross-section which has a first leg part 18a which is arranged at the side close to the pivot shafts JL and JR and a second leg part 18b which is arranged at the side far from the pivot shafts JL and JR when attached to the chassis. Between the first and second leg parts 18a and 18b, a recess 17 which extends in the longitudinal direction of the torsion beam 12 is formed. The recess 17 becomes gradually deeper in depth from the first and second connection parts 15a and 15b toward the fixed shape part 13 over the first and second asymmetric shape parts 14a and 14b and becomes substantially constant in depth at the fixed shape part 13.

The fixed shape part 13 is a region where the cross-sectional shape vertical to the longitudinal direction of the torsion beam 12 substantially no longer changes in the longitudinal direction of the torsion beam 12. The first and second connection parts 15a and 15b have shapes which are suitable for connecting the torsion beam 12 to the trailing arms 11L and 11R. Further, the first and second connection parts 15a and 15b are formed with shallow recesses 17 (FIG. 5D) at only regions which adjoin the first and second asymmetric shape parts 14a and 14b. In the present embodiment, the recesses 17 are not formed at the front ends of the torsion beam 12 which are connected to the trailing arms 11L and 11R and the parts adjoining those front ends. Alternatively, the first and second connection parts 15a and 15b need not be provided with recesses 17. The first and second connection parts 15a and 15b can be made regions of lengths from the front ends of the torsion beam 12 substantially equal to the equivalent diameters of the first and second connection parts 15a and 15b.

Figure 5A:
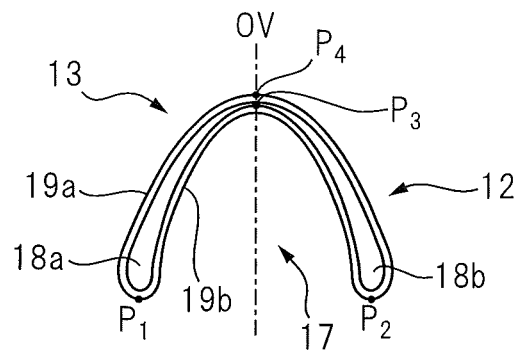
FIG. 5A is a schematic cross-sectional view of a torsion beam along the arrow A-A of FIG. 2.
Figure 5B:
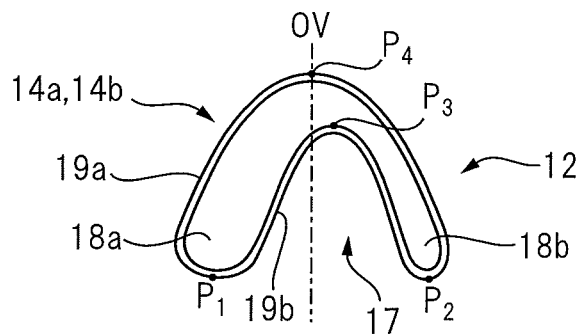
FIG. 5B is a schematic cross-sectional view of a torsion beam along the arrow B-B of FIG. 2.
Figure 5C:
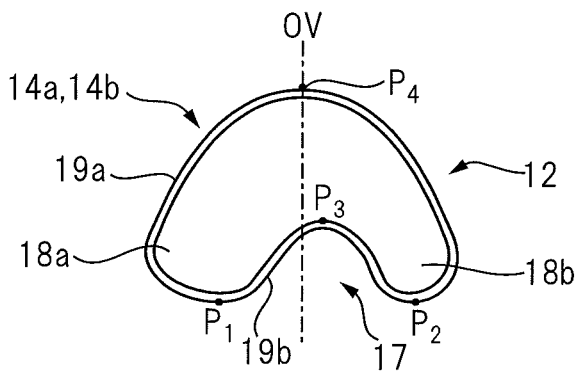
FIG. 5C is a schematic cross-sectional view of a torsion beam along the arrow C-C of FIG. 2.
Figure 5D:
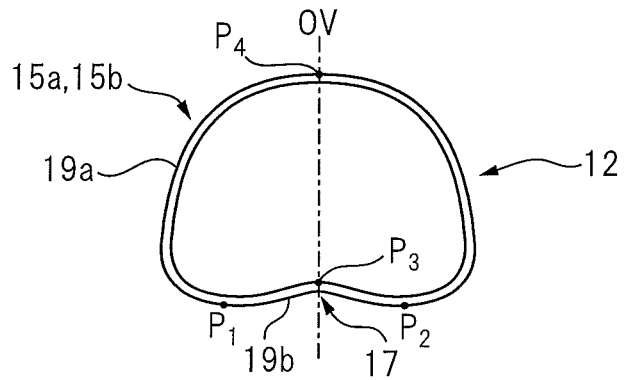
FIG. 5D is a schematic cross-sectional view of a torsion beam along the arrow D-D of FIG. 2.

The first and second asymmetric shape parts 14a and 14b, as shown in FIGS. 5A and 5B, are regions where the cross-sections of the first and second asymmetric shape parts 14a and 14b are formed asymmetrically in the front-rear direction so that the first leg part 18a becomes thicker than the second leg part 18b.

Figure 6:
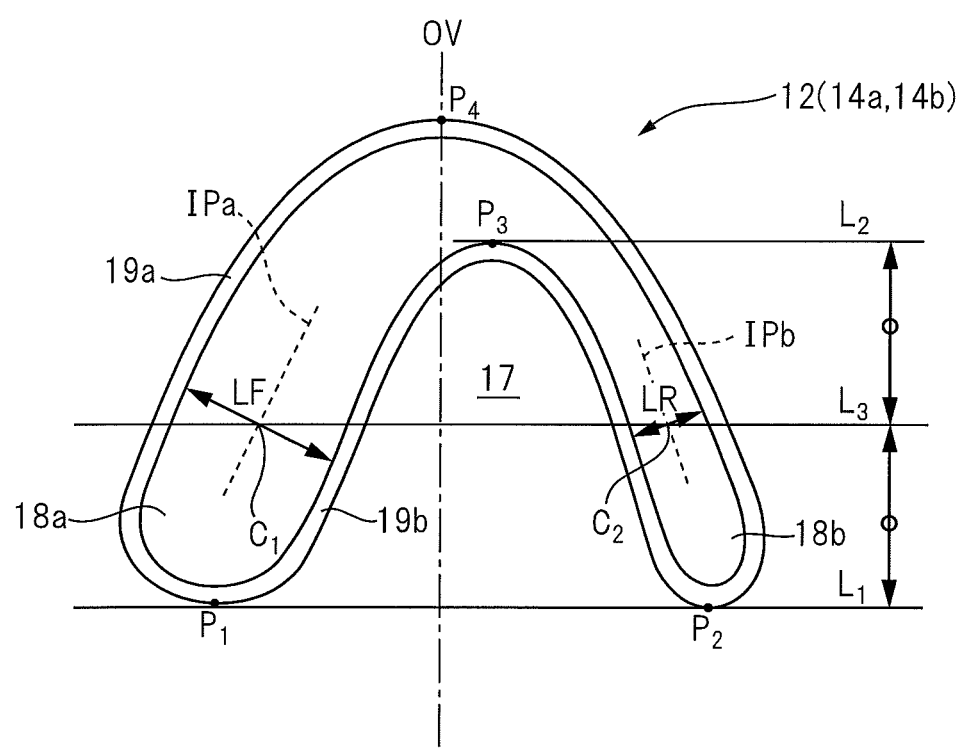
FIG. 6 is an enlarged view of a cross-section along the arrow B-B of FIG. 2 (FIG. 5B).
Figure 7:
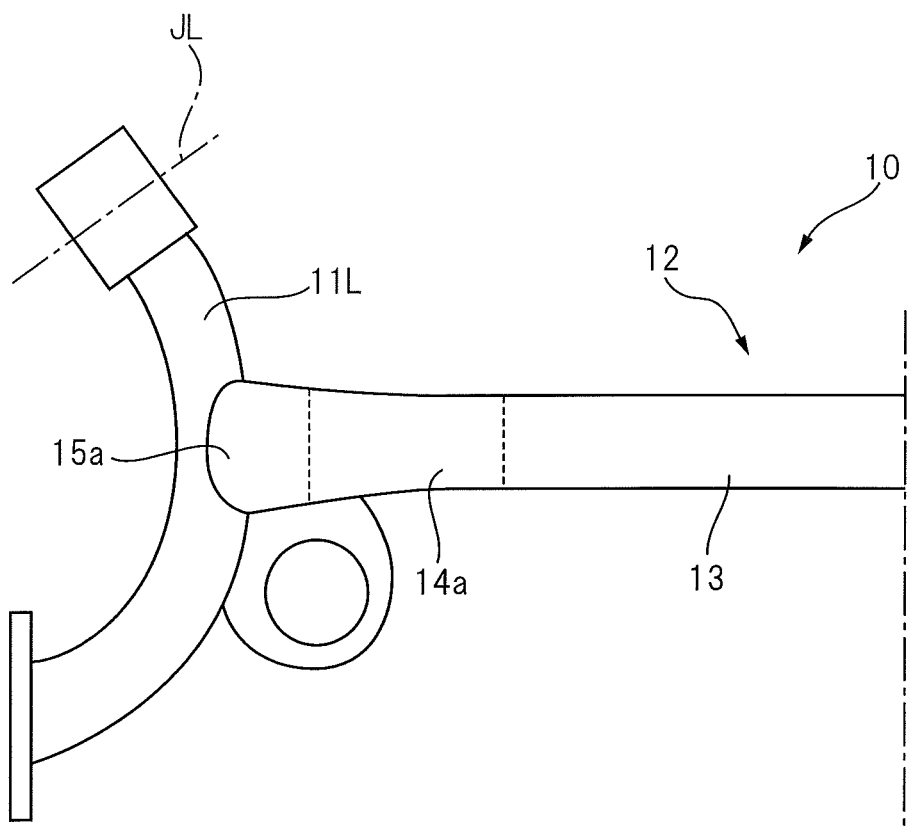
FIG. 7 is a schematic view which shows changes in the cross-section of a torsion beam according to a first embodiment.
Figure 7:
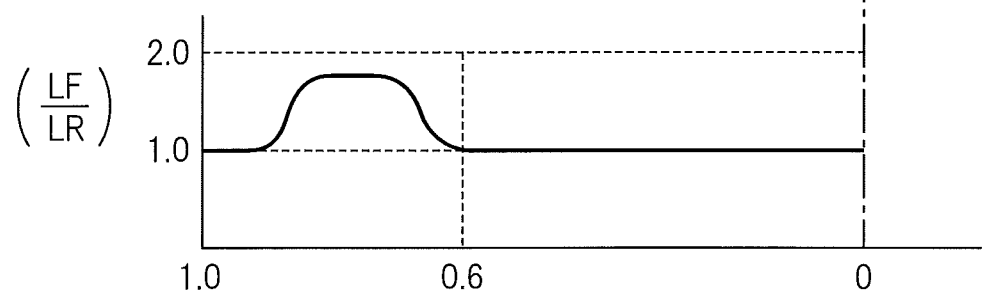

Here, if referring to FIG. 6, which is an enlarged view of the cross-section along the arrow B-B of FIG. 2 (FIG. 5B), the torsion beam 12 is comprised of an outside wall part 19a and an inside wall part 19b. Between the two, an inside space is formed. The outside wall part 19a is a wall part which extends from a front end point P1 of the first leg part 18a past a vertex P4 to a front end point P2 of the second leg part 18b. The inside wall part 19b is a wall part which extends from the front end point P1 of the first leg part 18a past the vertex P3 of the recess 17 to the front end point P2 of the second leg part 18b. The axial line OV is an axial line which passes vertically with respect to the line segment P1P2 through the center between the front end points P1 and P2 of the first and second leg parts 18a and 18b. In the torsion beam 12 according to the first embodiment, the vertex P4 of the outside wall part 19a is arranged on the axial line OV, but the vertex P3 of the inside wall part 19b is offset from the axial line OV to the rear, that is, in a direction away from the pivot shafts JL and JR, at the asymmetric shape parts 14a and 14b.

Further, in FIG. 6, the line L1 is a common tangential line which contacts the front end points P1 and P2 of both of the first and second leg parts 18a and 18b. The line L2 is a line which is parallel to the line L1 and contacts the vertex P3 of the recess 17. The line L3 is a line which is parallel to the lines L1 and L2 and at equal distances from the lines L1 and L2. At the asymmetric shape parts 14a and 14b, at the parts where the first and second leg parts 18a and 18b intersect the line L3, the thickness or width dimension of the first leg part 18a becomes greater than the thickness or width dimension of the second leg part 18b. The thickness or width dimension of the first leg part 18a can be made the distance LF between the outside wall part 19a and the inside wall part 18b passing through the cross point C1 of the intermediate plane IPa between the outside wall part 19a and the inside wall part 19b and the line L3 at the first leg part 18a. Similarly, the thickness or width dimension of the second leg part 18b can be made the distance LR between the outside wall part 19a and the inside wall part 18b passing through the cross point C2 of the intermediate plane IPb between the outside wall part 19a and the inside wall part 19b and the line L3 at the second leg part 18b.

At the first and second asymmetric shape parts 14a and 14b, the ratio $\alpha=LF/LR$ of the thickness or width dimension of the first and second leg parts 18a and 18b changes in the longitudinal direction of the torsion beam 12, but in the first embodiment, at the maximum, it becomes $\alpha max=1.8$. The inventors of the present invention discovered the following facts from numerical analysis of the torsion beam 12.

(1) The larger the value of $\alpha$, the more the tensile stress S1 which occurs at the inside wall part 19b which forms the recess 17 at the first leg part 18a is reduced.

(2) The larger the value of $\alpha$, the more the tensile stress S2 which occurs at the inside wall part 19b which forms the recess 17 at the second leg part 18b is increased.

From the above reasons (1) and (2), it was learned that there is a suitable range for the value of $\alpha$ of the ratio of the thicknesses or width dimensions of the first and second leg parts 18a and 18b at the first and second asymmetric shape parts 14a and 14b and that, from the numerical analysis, $1.1 \leq \alpha \leq 2.5$ is preferable. Further, if the value of $\alpha$ is unnecessarily large, the shapeability when the torsion beam 12 is press-formed from a metal pipe member drops. Furthermore, from numerical analysis, it is learned that to obtain a sufficient effect of stress relaxation, the dimensions of the first and second asymmetric shape parts 14a and 14b in the longitudinal direction are preferably made equal to each other and are made 5% or more of the length of the torsion beam 12. Furthermore, the dimensions of the first and second asymmetric shape parts 14a and 14b in the longitudinal direction are preferably made 40% or less of the length of the torsion beam 12. Note that, in the first embodiment, the lengths of the first and second asymmetric shape parts 14a and 14b are 20% of the length of the torsion beam 12.

Figure 4:
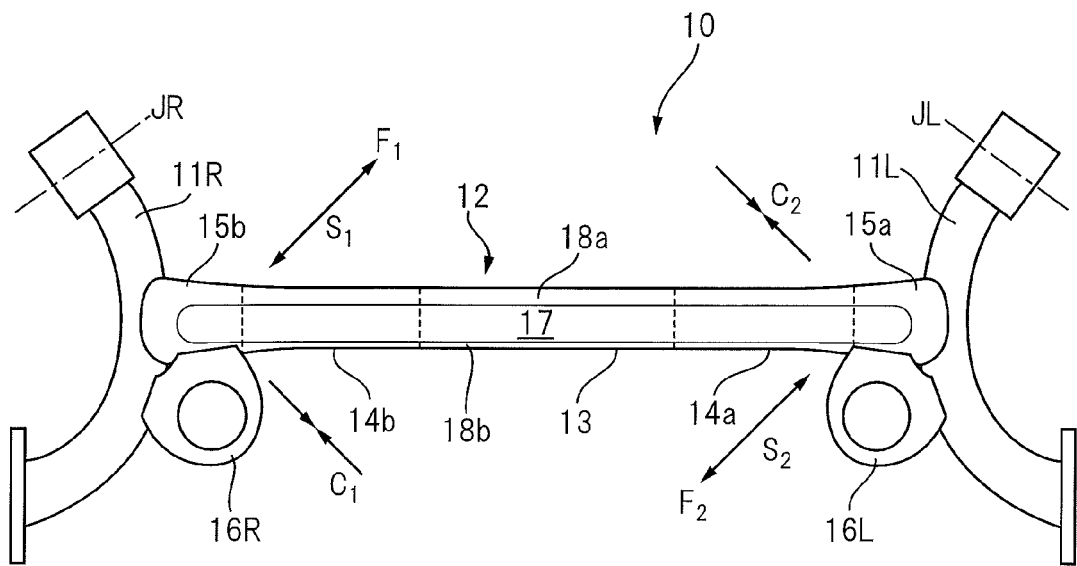
FIG. 4 is a schematic bottom view of a torsion beam assembly of FIG. 2 which together shows a main stress which occurs at the torsion beam.

Next, referring again to FIG. 4, the action of the torsion beam 12 according to the first embodiment will be explained. If one of the left-right pair of trailing arms 11R and 11L swings about the pivot shaft JR or JL, the other trailing arm swings relatively to the opposite side. For example, if the right wheel which is attached to the torsion beam type rear suspension system 1 receives upward force, the right side trailing arm 11R swings upward about the pivot shaft JR, while the left side trailing arm 11L swings relatively downward with respect to the right side trailing arm 11R. Due to this, as shown in FIG. 4, at the right half of the torsion beam 12, a large tensile stress S1 occurs in the direction F1 at the inside wall part 18b of the first leg part 18a, while at the left half, smaller tensile stress S2 than the direction F2 occurs at the inside wall part 19b of the second leg part 18b. Conversely, at the right half of the torsion beam 12, compressive stress P1 occurs at the inside wall part 19b of the second leg part 18b, while at the left half, compressive stress P2 occurs at the inside wall part 18b of the first leg part 18a. Further, it will be understood that when the left wheel receives upward force and the left side trailing arm 11L swings upward, an action opposite to the above action occurs.

According to the torsion beam 12 according to the first embodiment, at the first and second asymmetric shape parts 14a and 14b of the torsion beam 12, it is possible to greatly reduce the tensile stress S1 in the direction F1 which occurs at the inside wall part 18b of the first leg part 18a. This is because, at the asymmetric shape parts 14a and 14b of the torsion beam 12, the first leg part 18a is made thick, that is, the distance Lf between the outside wall part 19a and the inside wall part 18b is increased, whereby at the asymmetric shape parts 14a and 14b, the cross-sectional rigidity of the first leg part 18a becomes higher and the tensile stress is reduced. On the other hand, at the asymmetric shape parts 14a and 14b of the torsion beam 12, the distance Lr between the outside wall part 19a and the inside wall part 19b at the second leg part 18b is smaller than the distance LF between the outside wall part 19a and inside wall part 18b of the first leg part 18a, so the cross-sectional rigidity falls. For this reason, at the asymmetric shape parts 14a and 14b of the torsion beam 12, the tensile stress S2 which occurs at the inside wall part 19b of the second leg part 18b increases, but by making the value of α at the asymmetric shape parts 14a and 14b a suitable value, the tensile stress S2 can be made smaller than the tensile stress S1.

According to the torsion beam 12, torsion beam assembly 10, and torsion beam type rear suspension system 1 according to the first embodiment, the torsion beam 12 is provided with the first and second asymmetric shape parts 14a and 14b where the distances LF and LR in the vehicle front-rear direction of the outside wall part 19a and inside wall part 19b are formed asymmetrically, so the stress which occurs at the torsion beam 12 can be controlled independently from the rigidity of the torsion beam 12, and therefore the torsional rigidity of the torsion beam 12 and the value of the maximum main stress can be easily and suitably set.

Further, the torsion beam 12 according to the first embodiment gives the outside wall part 19a a cross-sectional shape which is symmetric in the front-rear direction relative to the axial line OV in the same way as a conventional torsion beam so as to enable easy substitution in a conventional torsion beam type rear suspension. According to the torsion beam 12 of the present embodiment, it is possible to maintain the desired suspension performance while reducing the value of the maximum main stress of the torsion beam 12 so as to effectively reduce the metal fatigue which occurs at the torsion beam 12.

Next, referring to FIG. 8A to FIG. 8D, a second embodiment of the present invention will be explained. In FIG. 8A to FIG. 8D, component elements similar to the embodiment which is shown in FIG. 5A to FIG. 5D are assigned the same reference notations.

Figure 8A:
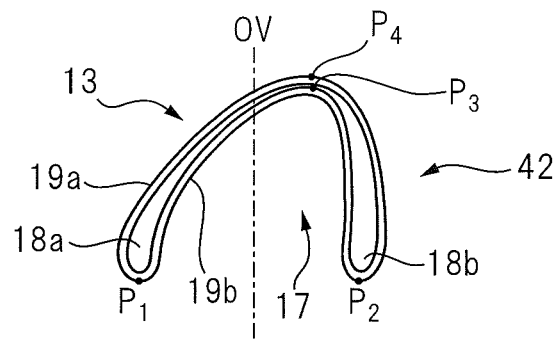
FIG. 8A is a view which shows a schematic cross-section of a torsion beam according to a second embodiment and a schematic cross-sectional view of a torsion beam along the arrow A-A of FIG. 2.
Figure 8B:
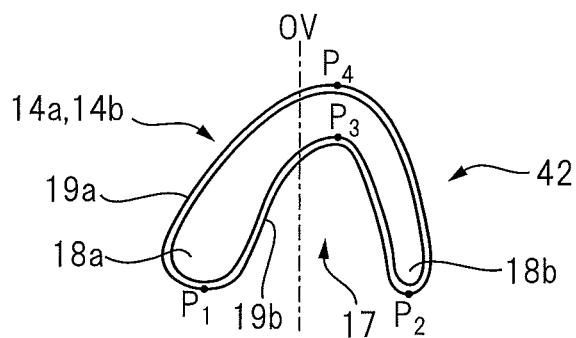
FIG. 8B is a view which shows a schematic cross-section of a torsion beam according to a second embodiment and a schematic cross-sectional view of a torsion beam along the arrow B-B of FIG. 2.
Figure 8C:
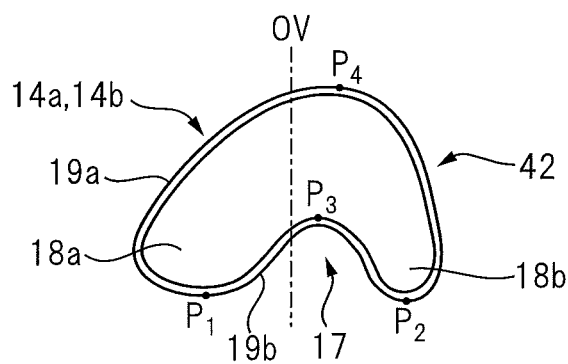
FIG. 8C is a view which shows a schematic cross-section of a torsion beam according to a second embodiment and a schematic cross-sectional view of a torsion beam along the arrow C-C of FIG. 2.
Figure 8D:
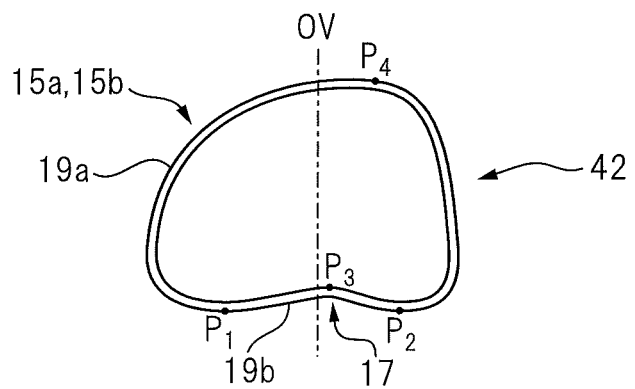
FIG. 8D is a view which shows a schematic cross-section of a torsion beam according to a second embodiment and a schematic cross-sectional view of a torsion beam along the arrow D-D of FIG. 2.

The torsion beam 42 according to the second embodiment, like the torsion beam 12 according to the first embodiment 12, is provided with a fixed shape part (FIG. 8A), asymmetric shape parts 14a and 14b (FIGS. 8B and 8C), and connection parts (FIG. 8D). At the asymmetric shape parts 14a and 14b, the first leg part 18a is formed thicker than the second leg part 18b. However, the second embodiment differs from the first embodiment on the point that the vertex P4 of the outside wall part 19a is offset from the axial line OV to the rear, that is, in a direction away from the pivot shafts JL and JR. The vertex P3 of the inside wall part 19b is also offset from the axial line OV to the rear.

According to the torsion beam 42 according to the second embodiment, the position of the vertex P4 of the outside wall part 49a is not restricted to one on the axial line OV, so the cross-sectional shapes of the fixed shape part and asymmetric shape parts 14a and 14b can be selected much more freely compared with the first embodiment. Compared to the torsion beam according to the first embodiment 12, it becomes possible to suppress the torsional rigidity of the torsion beam 42 more while reducing the tensile stress.

Figure 9A:
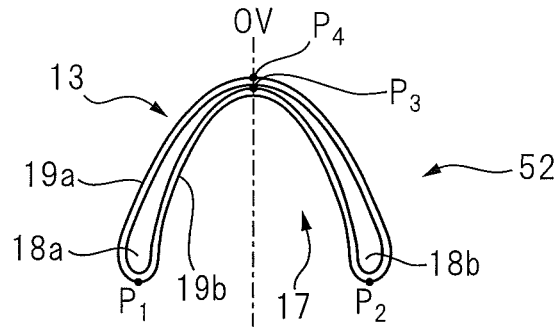
FIG. 9A is a view which shows a schematic cross-section of a torsion beam according to a third embodiment and a schematic cross-sectional view of a torsion beam along the arrow A-A of FIG. 2.
Figure 9B:
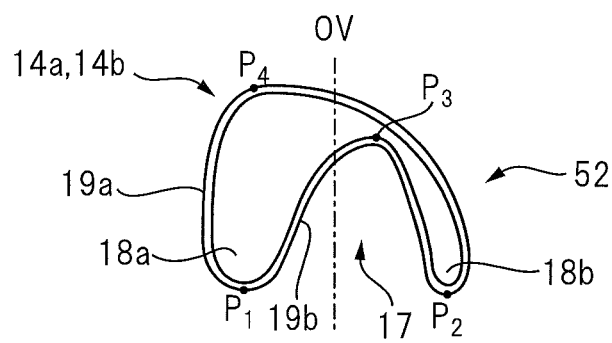
FIG. 9B is a view which shows a schematic cross-section of a torsion beam according to a third embodiment and a schematic cross-sectional view of a torsion beam along the arrow B-B of FIG. 2.
Figure 9C:
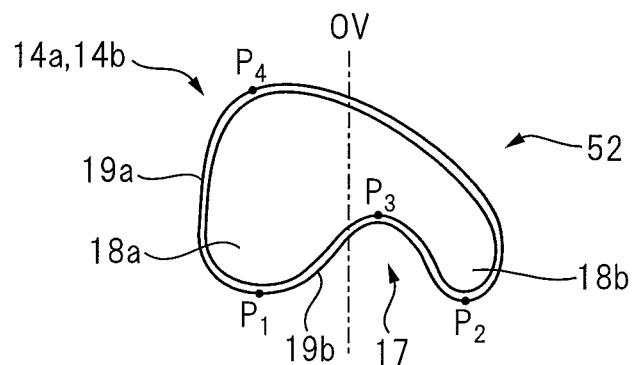
FIG. 9C is a view which shows a schematic cross-section of a torsion beam according to a third embodiment and a schematic cross-sectional view of a torsion beam along the arrow C-C of FIG. 2.
Figure 9D:
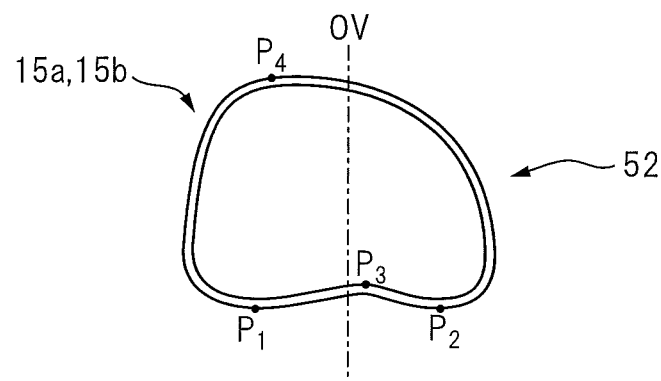
FIG. 9D is a view which shows a schematic cross-section of a torsion beam according to a third embodiment and a schematic cross-sectional view of a torsion beam along the arrow D-D of FIG. 2.

Next, referring to FIG. 9A to FIG. 9D, a third embodiment of the present invention will be explained. In FIG. 9A to FIG. 9D as well, component elements which are similar to those of the embodiment which is shown in FIG. 5A to FIG. 5D will be assigned the same reference notations. The torsion beam 52 according to the third embodiment as well, like in the torsion beam 12 according to the first embodiment 12, is provided with a fixed shape part (FIG. 9A), asymmetric shape parts 14a and 14b (FIGS. 9B and 9C), and connection parts (FIG. 9D). At the asymmetric shape parts 14a and 14b, the first leg part 18a is formed thicker than the second leg part 18b. However, the third embodiment differs from the first embodiment on the point that the vertex P4 of the outside wall part 19a is arranged on the axial line OV at the fixed shape part, but at the symmetric shape parts 14a and 14b and the connection parts, it is offset from the axial line OV to the front, that is, in a direction approaching the pivot shafts JL and JR. Further, the third embodiment differs from the first embodiment as well on the point that the vertex P3 of the inside wall part 19b is arranged on the axial line OV at the fixed shape part, but is offset from the axial line OV to the rear at the asymmetric shape parts 14a and 14b and connection parts.

According to the torsion beam 52 according to the third embodiment, compared with the first embodiment, even if the cross-sectional shape of the inside wall part 19b changes in a small range, it is possible to reduce the stress equally as in the first embodiment, so this embodiment is advantageous in the point of being excellent in shapeability.

Figure 10A:
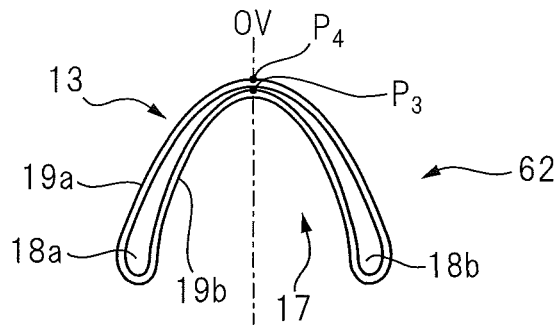
FIG. 10A is a view which shows a schematic cross-section of a torsion beam according to a fourth embodiment and a schematic cross-sectional view of a torsion beam along the arrow A-A of FIG. 2.
Figure 10B:
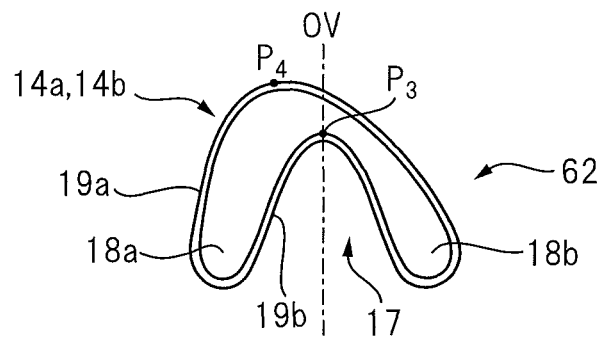
FIG. 10B is a view which shows a schematic cross-section of a torsion beam according to a fourth embodiment and a schematic cross-sectional view of a torsion beam along the arrow A-A of FIG. 2.
Figure 10C:
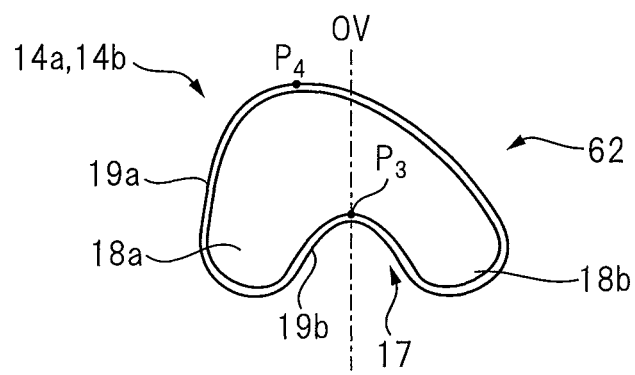
FIG. 10C is a view which shows a schematic cross-section of a torsion beam according to a fourth embodiment and a schematic cross-sectional view of a torsion beam along the arrow C-C of FIG. 2.
Figure 10D:
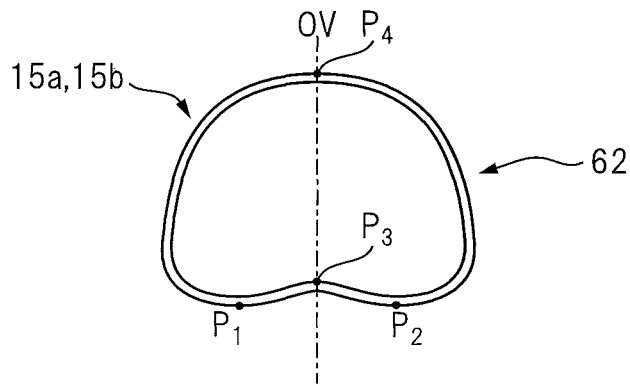
FIG. 10D is a view which shows a schematic cross-section of a torsion beam according to a fourth embodiment and a schematic cross-sectional view of a torsion beam along the arrow D-D of FIG. 2.

Next, referring to FIG. 10A to FIG. 10D, a fourth embodiment of the present invention will be explained. In FIG. 10A to FIG. 10D as well, component elements similar to the embodiment which is shown in FIG. 5A to FIG. 5D are assigned the same reference notations. The torsion beam 62 according to the fourth embodiment as well, like the torsion beam 12 according to the first embodiment, is provided with a fixed shape part (FIG. 10A), asymmetric shape parts 14a and 14b (FIG. 10B, 10C), and connection parts (FIG. 10D). At the asymmetric shape parts 14a and 14b, the first leg part 18a is formed thicker than the second leg part 18b. However, the fourth embodiment differs from the first embodiment on the point that the vertex P4 of the outside wall part 19a is arranged on the axial line OV at the fixed shape part, but is offset from the axial line OV to the front, that is, in a direction approaching the pivot shafts JL and JR, at the asymmetric shape parts 14a and 14b and connection parts. Further, in the fourth embodiment, the vertex P3 of the inside wall part 19b is arranged on the axial line OV over the entire length of the recess 17.

According to the torsion beam 62 according to the fourth embodiment, the range of selection of shape of the outside wall part 19a becomes broader, so compared with the first embodiment, it is possible to increase the value of α at the asymmetric shape parts 14a and 14b and it becomes possible to obtain equal effects even with smaller asymmetric shape parts 14a and 14b.

Figure 11A:
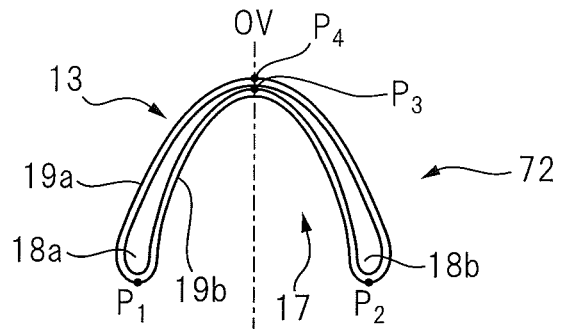
FIG. 11A is a view which shows a schematic cross-section of a torsion beam according to a fifth embodiment and a schematic cross-sectional view of a torsion beam along the arrow A-A of FIG. 2.
Figure 11B:
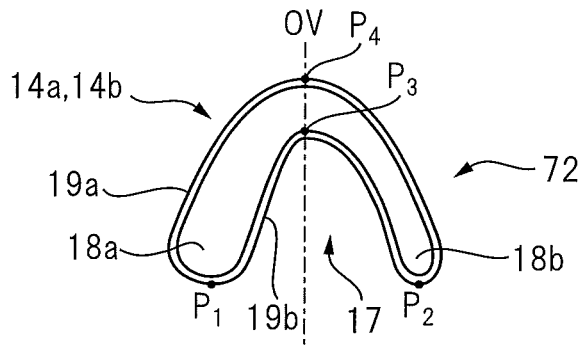
FIG. 11B is a view which shows a schematic cross-section of a torsion beam according to a fifth embodiment and a schematic cross-sectional view of a torsion beam along the arrow B-B of FIG. 2.
Figure 11C:
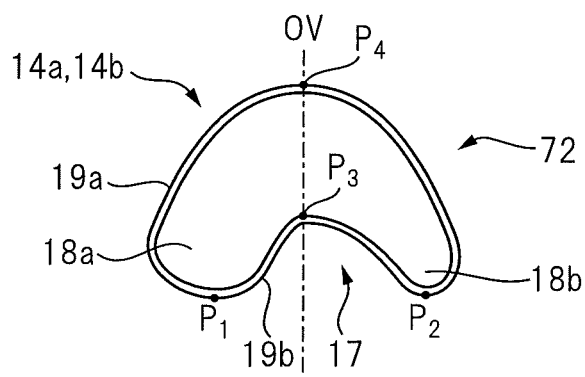
FIG. 11C is a view which shows a schematic cross-section of a torsion beam according to a fifth embodiment and a schematic cross-sectional view of a torsion beam along the arrow C-C of FIG. 2.
Figure 11D:
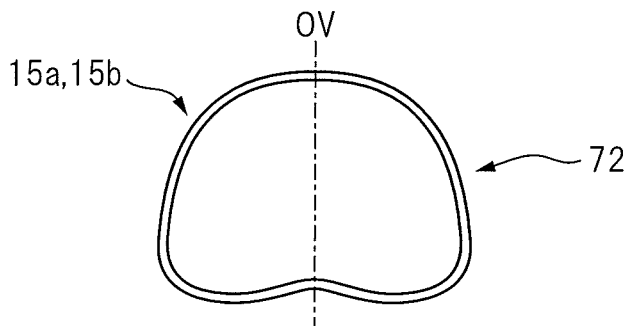
FIG. 11D is a view which shows a schematic cross-section of a torsion beam according to a fifth embodiment and a schematic cross-sectional view of a torsion beam along the arrow D-D of FIG. 2.

Next, referring to FIG. 11A to FIG. 11D, a fifth embodiment of the present invention will be explained. In FIG. 11A to FIG. 11D as well, component elements which are similar to the embodiment which is shown in FIG. 5A to FIG. 5D are assigned the same reference notations. The torsion beam 72 according to the fifth embodiment as well, like the torsion beam 12 according to the first embodiment 12, is provided with a fixed shape part (FIG. 11A), asymmetric shape parts 14a and 14b (FIGS. 11B and 11C), and connection parts (FIG. 11D). At the asymmetric shape parts 14a and 14b, the first leg part 18a is formed thicker than the second leg part 18b. However, the fifth embodiment differs from the first embodiment on the point that the vertexes P4 and P3 of both of the outside wall part 19a and inside wall part 19b are arranged on the axial line OV.

According to the torsion beam 72 according to the fifth embodiment, the R value at the asymmetric shape parts 14a and 14b can be made larger, so compared with the first embodiment, equal effects can be obtained even if the asymmetric shape parts 14a and 14b are smaller. Also, the vertexes P4 and P3 of the outside wall part 19a and the inside wall part 19b are on the axial line OV, that is, are positioned at the center of the torsion beam 12 in the width direction, so compared with the first embodiment, the shapeability becomes good.

Figure 12A:
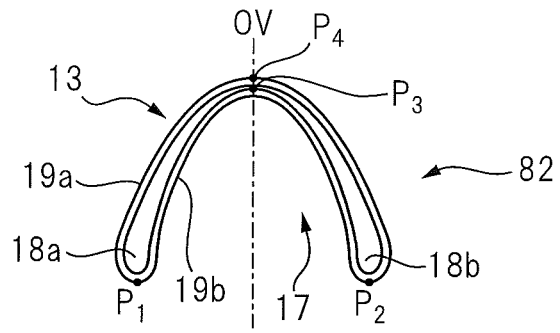
FIG. 12A is a view which shows a schematic cross-section of a torsion beam according to a sixth embodiment and a schematic cross-sectional view of a torsion beam along the arrow A-A of FIG. 2.
Figure 12B:
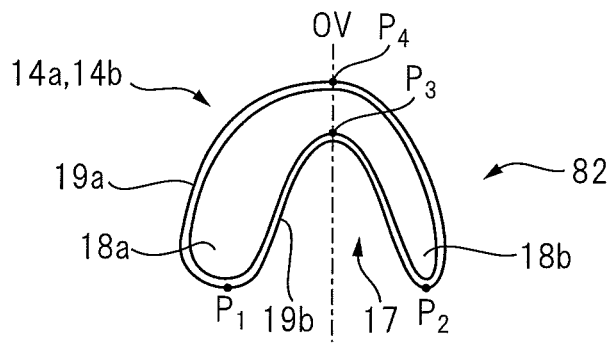
FIG. 12B is a view which shows a schematic cross-section of a torsion beam according to a sixth embodiment and a schematic cross-sectional view of a torsion beam along the arrow B-B of FIG. 2.
Figure 12C:
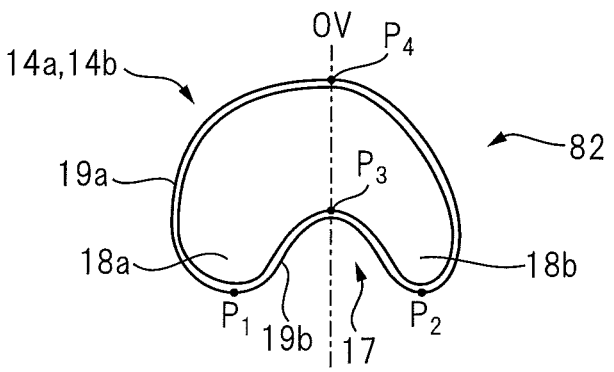
FIG. 12C is a view which shows a schematic cross-section of a torsion beam according to a sixth embodiment and a schematic cross-sectional view of a torsion beam along the arrow C-C of FIG. 2.
Figure 12D:
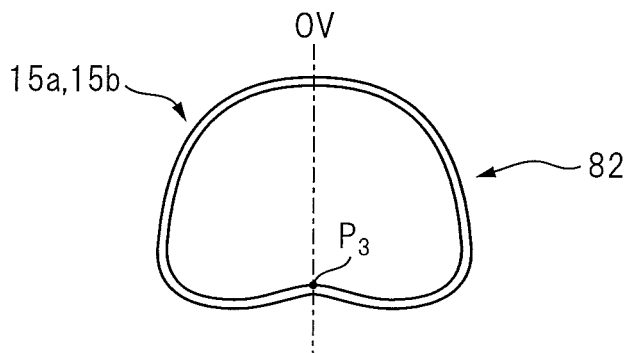
FIG. 12D is a view which shows a schematic cross-section of a torsion beam according to a sixth embodiment and a schematic cross-sectional view of a torsion beam along the arrow D-D of FIG. 2.

Next, referring to FIG. 12A to FIG. 12D, a sixth embodiment of the present invention will be explained. In FIG. 12A to FIG. 12D as well, component elements which are similar to the embodiment which is shown in FIG. 5A to FIG. 5D are assigned the same reference notations. The torsion beam 82 according to the sixth embodiment as well, like the torsion beam 12 according to the first embodiment 12, is provided with a fixed shape part (FIG. 12A), asymmetric shape parts 14a and 14b (FIGS. 12B and 12C), and connection parts (FIG. 12D). At the asymmetric shape parts 14a and 14b, the first leg part 18a is formed thicker than the second leg part 18b. However, the sixth embodiment differs from the first embodiment on the point that the vertices P4 and P3 of both the outside wall part 19a and inside wall part 19b are arranged on the axial line OV. Further, the recess 17 is symmetric in shape in the front-rear direction of the automobile with respect to the axial line OV.

According to the torsion beam 82 according to the sixth embodiment 82, it is possible to increase the value of R at the asymmetric shape parts 14a and 14b and possible to obtain similar effects compared with the first embodiment even if the asymmetric shape parts 14a and 14b are smaller. Furthermore, in the torsion beam 82 according to the sixth embodiment 82, the vertices P4 and P3 of the outside wall part 19a and the inside wall part 19b are on the axial line OV of the torsion beam 82, so compared with the first embodiment, the shapeability becomes good.

Figure 13A:
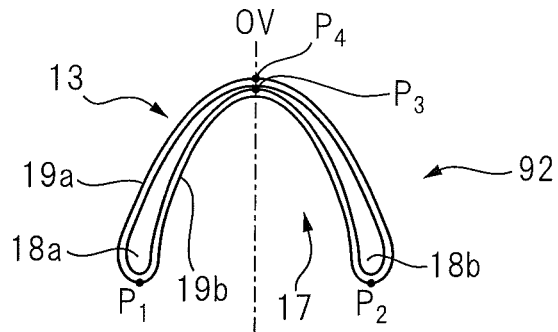
FIG. 13A is a view which shows a schematic cross-section of a torsion beam according to a seventh embodiment and a schematic cross-sectional view of a torsion beam along the arrow A-A of FIG. 2.
Figure 13B:
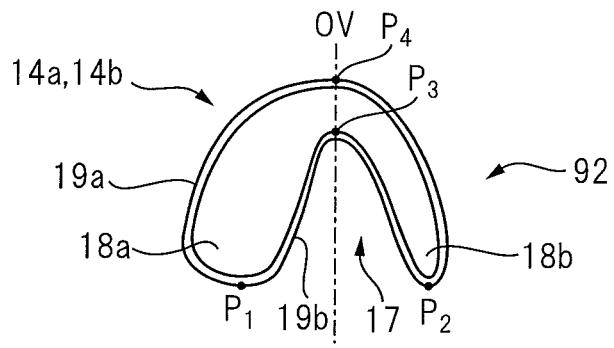
FIG. 13B is a view which shows a schematic cross-section of a torsion beam according to a seventh embodiment and a schematic cross-sectional view of a torsion beam along the arrow B-B of FIG. 2.
Figure 13C:
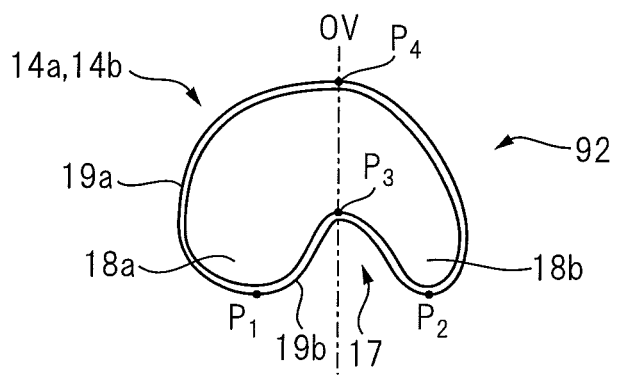
FIG. 13C is a view which shows a schematic cross-section of a torsion beam according to a seventh embodiment and a schematic cross-sectional view of a torsion beam along the arrow C-C of FIG. 2.
Figure 13D:
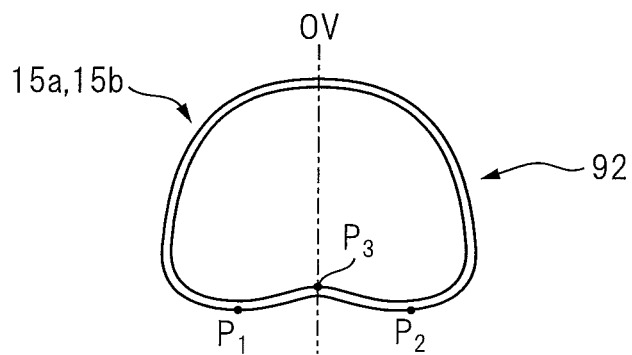
FIG. 13D is a view which shows a schematic cross-section of a torsion beam according to a seventh embodiment and a schematic cross-sectional view of a torsion beam along the arrow D-D of FIG. 2.

Next, referring to FIG. 13, a seventh embodiment of the present invention will be explained. In FIG. 13A to FIG. 13D as well, component elements which are similar to the embodiment which is shown in FIG. 5A to FIG. 5D are assigned the same reference notations. The torsion beam 92 according to the seventh embodiment 92 as well, like the torsion beam 12 according to the first embodiment, is provided with a fixed shape part (FIG. 13A), asymmetric shape parts 14a and 14b (FIGS. 13B and 13C), and connection parts (FIG. 13D). At the asymmetric shape parts 14a and 14b, the first leg part 18a is formed thicker than the second leg part 18b. However, the seventh embodiment differs from the first embodiment on the point that the vertices P4 and P3 of both of the outside wall part 19a and inside wall part 19b are on the axial line OV, that is, are arranged at the center of the torsion beam in the width direction. Furthermore, the recess 17 is symmetric in shape in the front-rear direction of the automobile with respect to the axial line OV.

According to the torsion beam 72 according to the seventh embodiment, it is possible to make the value of α at the asymmetric shape parts 14a and 14b larger. Compared with the first embodiment, even if the asymmetric shape parts 14a and 14b are narrower, equal effects can be obtained. Since the vertices of the outside wall part 19a and the inside wall part 19b are positioned at the center of the torsion beam in the width direction, it becomes possible to improve the shapeability compared with the first embodiment.

EXAMPLES

Next, examples of the present invention will be explained. The results of simulation using a torsion beam of a substantially V-shaped or U-shaped cross-section with the vertex formed at the top are shown in Table 1. Note that, in Table 1, the results of simulation of the examples are shown by ratios with respect to a comparative example of a conventional torsion beam. The rough dimensions of the torsion beams used in the simulation were a longitudinal direction length of 1000 mm, a width at the center in the longitudinal direction of 95 mm, and a height at the center in the longitudinal direction of 55 mm. Further, the simulation was performed by applying 5000N external force in opposite directions to the left and right wheels and giving displacement so that the difference in heights of the left-right wheels became 140 mm.

The torsion beam of the comparative example is not provided with the asymmetric shape parts and is formed symmetrically in the front-rear direction across the entire length of the torsion beam. Example 1 is a torsion beam according to a first embodiment wherein the asymmetric shape parts 14a and 14b extend in the torsion beam longitudinal direction to one side along 200 mm and the maximum value of α at the asymmetric shape parts 14a and 14b is 1.8.

Example 2 is a torsion beam according to a second embodiment wherein the asymmetric shape parts 14a and 14b extend in the torsion beam longitudinal direction to one side along 400 mm and the maximum value of α at the asymmetric shape parts 14a and 14b is 1.8.

Example 3 is a torsion beam according to a third embodiment wherein the asymmetric shape parts 14a and 14b extend in the torsion beam longitudinal direction to one side along 200 mm and the maximum value of α at the asymmetric shape parts 14a and 14b is 1.8.

Example 4 is a torsion beam according to a fourth embodiment wherein the asymmetric shape parts 14a and 14b extend in the torsion beam longitudinal direction to one side along 150 mm and the maximum value of α at the asymmetric shape parts 14a and 14b is 1.8.

Example 5 is a torsion beam according to a fifth embodiment wherein the asymmetric shape parts 14a and 14b extend in the torsion beam longitudinal direction to one side along 150 mm and the maximum value of α at the asymmetric shape parts 14a and 14b is 1.8.

Example 6 is a torsion beam according to a sixth embodiment wherein the asymmetric shape parts 14a and 14b extend in the torsion beam longitudinal direction to one side along 150 mm and the maximum value of α at the asymmetric shape parts 14a and 14b is 1.8.

Example 7 is a torsion beam according to a seventh embodiment wherein the asymmetric shape parts 14a and 14b extend in the torsion beam longitudinal direction to one side along 150 mm and the maximum value of α at the asymmetric shape parts 14a and 14b is 1.8.

TABLE 1

| | Ratio of maximum main stress occurring in torsion beam due in different examples with respect to comparative example | Ratio of torsion rigidity of torsion beam in different examples with respect to comparative example | Shapeability |
| --- | --- | --- | --- |
| Comp. ex. | 1.0 | 1.0 | VG |
| Example 1 | 0.94 | 1.0 | G |
| Example 2 | 0.90 | 1.0 | F |
| Example 3 | 0.94 | 1.0 | G |
| Example 4 | 0.94 | 1.0 | G |
| Example 5 | 0.94 | 1.0 | G |
| Example 6 | 0.94 | 1.0 | G |
| Example 7 | 0.94 | 1.0 | VG |

Note that, in Table 1, the shapeability is judged by the positional precisions of the vertices of the outside wall part 19a and inside wall part 19b in the width direction and the height direction found as a result of shape analysis by FEM. The case where the position precision of the vertexes of the outside wall part 19a and inside wall part 19b in the width direction and height direction results in an error of over 2 mm from the settings was indicated as "F" (Fair), over 1 mm to 2 mm as "G" (Good), and 1 mm or less as "VG" (Very Good).

As will be understood from Table 1, in Example 2, the value of the maximum main stress was reduced 10% and the torsional rigidity was substantially equal. Further, in Example 7, the shapeability was equal to a conventional torsion beam, the value of the maximum main stress was reduced 6%, and the torsional rigidity was substantially equal. If the value of the maximum main stress is reduced 6%, the fatigue durability of the torsion beam increases about 1.5-fold, while if the value of the maximum main stress is reduced 10%, the fatigue durability of the torsion beam increase about 2-fold, so it will be understood that according to the present invention, the effect is obtained of maintaining the torsional rigidity constant while improving the fatigue durability of the torsion beam.

Note that, the present invention is not limited to the already explained embodiments. Various modifications and improvements are possible without departing from the spirit and scope of the present invention. For example, in the already explained embodiments, substantially V-shaped or substantially U-shaped cross-section torsion beams 12, 42, 52, 62, 72, 82, and 92 which were open at the bottom and had vertices formed at the top were explained, but they may also be configured to be open at the top and have vertices formed at the bottom.

Further, in the already explained embodiments, the case where the asymmetric shape parts 14a and 14b were formed between the fixed shape part 13 and the connection parts 15a and 15b and the shape was gradually deformed from the fixed shape part 13 to the connection parts 15a and 15b was explained, but at what positions to arrange the asymmetric shape parts 14a and 14b in the longitudinal direction of the torsion beam or how to deform the fixed shape part 13 and connection parts 15a and 15b may be set in any way.

Further, at which of the top or bottom to arrange the vertex of the cross-section perpendicular to the longitudinal direction in the torsion beams 12, 42, 52, 62, 72, 82, and 92 or how much to displace the vertex in either the front-rear direction and top-bottom direction of the vehicle may be selected in any way.

Further, in the already explained embodiments, the case where the torsion beam type suspension system was the torsion beam type rear suspension system 1 was explained, but for example the present invention can also be applied to a leading arm type suspension system.

INDUSTRIAL APPLICABILITY

Metal fatigue of the torsion beam which forms the torsion beam type suspension system is suppressed and the fatigue strength of the torsion beam type suspension system is improved, so the invention can be utilized industrially.

REFERENCE SIGNS LIST 1. torsion beam type rear suspension system
10. torsion beam assembly
11L. trailing arm
11R. trailing arm
12. torsion beam
13: fixed shape part
14a. first asymmetric shape part
14b. second asymmetric shape part
15a. first connection part
15b. second connection part
16L. spring receiving part
16R. spring receiving part
17. recess
18a. first leg part
18b. second leg part
19a. outside wall part
19b. inside wall part
20. spring
30. damper
42. torsion beam
52. torsion beam
62. torsion beam
72. torsion beam
82. torsion beam 92. torsion beam
JL. pivot shaft
JR. pivot shaft
WL. wheel
WR. wheel

The invention claimed is:

1. A torsion beam which is used in a suspension system of an automobile which is provided with a pair of arm members which extend in a front-rear direction of said automobile and are designed to be connected at first end parts to a chassis of the automobile so as to be able to swing about pivot shafts in a top-bottom direction and to have wheels attached rotably at second end parts at opposite sides to the end parts which are connected to the chassis of the automobile, wherein
said torsion beam has a recess which extends in the longitudinal direction whereby that torsion beam has first and second leg parts in a plane vertical to said longitudinal direction and exhibits a substantially V-shaped or substantially U-shaped cross-sectional shape,
said torsion beam is provided with
connection parts which are provided at the two ends of that torsion beam and are connected to said arm members,
a fixed shape part which is provided at a center part in the longitudinal direction of that torsion beam, and
asymmetric shape parts which are provided between that fixed shape part and said connection parts,
at said fixed shape part, said recess has a constant depth and said first and second leg parts have generally the same thicknesses or width dimensions, and
at said asymmetric shape parts, the depth of said recess becomes gradually deeper from said connection parts toward said fixed shape part and said first leg part has a larger width dimension than the width dimension of said second leg part.

2. The torsion beam according to claim 1 wherein said first leg part is arranged closer to said pivot shaft than said second leg part when the suspension system in which said torsion beam is assembled is attached to the chassis of the automobile.

3. The torsion beam according to claim 1 wherein said asymmetric shape parts have lengths of 5% to 40% of the length of that torsion beam.

4. The torsion beam according to claim 1 wherein said first leg part has a width dimensions of 1.1 times to 2.5 times the width dimension of said second leg part.

5. The torsion beam according to claim 1 wherein said first and second leg parts have front end points, the torsion beam is comprised of an inside wall part which forms said recess between the front end points of said first and second leg parts and an outside wall part aside from that, and, at said asymmetric shape parts, the vertex of said outside wall part is arranged in the middle of the front end points of said first and second leg parts on an axial line vertical to the line passing through the front end points at said asymmetric shape parts.

6. The torsion beam according to claim 5 wherein the vertex of said inside wall part is arranged on the axial line at said asymmetric shape parts.

7. The torsion beam according to claim 5 wherein the vertex of said inside wall part is offset from said axial line to said first leg part side at said asymmetric shape parts.

8. The torsion beam according to claim 5 wherein the vertex of said inside wall part is offset from said axial line to said second leg part side at said asymmetric shape parts.

9. The torsion beam according to claim 1 wherein said first and second leg parts have front end points, the torsion beam is comprised of an inside wall part which forms said recess between the front end points of said first and second leg parts and an outside wall part aside from that, and, at said asymmetric shape parts, the vertex of said outside wall part is arranged in the middle of the front end points of said first and second leg parts offset from an axial line vertical to the line passing through the front end points to said first leg part side at said asymmetric shape parts.

10. The torsion beam according to claim 9 wherein the vertex of said inside wall part is arranged on said axial line at said asymmetric shape parts.

11. The torsion beam according to claim 9 wherein the vertex of said inside wall part is offset from said axial line to said first leg part side at said asymmetric shape parts.

12. The torsion beam according to claim 9 wherein the vertex of said inside wall part is offset from said axial line to said second leg part side at said asymmetric shape parts.

13. The torsion beam according to claim 1 wherein said first and second leg parts have front end points, the torsion beam is comprised of an inside wall part which forms said recess between the front end points of said first and second leg parts and an outside wall part aside from that, and, at said asymmetric shape parts, the vertex of said outside wall part is arranged in the middle of the front end points of said first and second leg parts offset from an axial line vertical to the line passing through the front end points to said second leg part side at said asymmetric shape parts.

14. The torsion beam according to claim 13 wherein the vertex of said inside wall part is arranged on said axial line at said asymmetric shape parts.

15. The torsion beam according to claim 13 wherein the vertex of said inside wall part is offset from said axial line to said first leg part side at said asymmetric shape parts.

16. The torsion beam according to claim 13 wherein the vertex of said inside wall part is offset from said axial line to said second leg part side at said asymmetric shape parts.

17. A torsion beam assembly which comprises
a pair of arm members which extend in a front-rear direction of an automobile and are designed to be connected at first end parts to a chassis of the automobile so as to be able to swing about pivot shafts in a top-bottom direction and to have wheels attached rotably at second end parts at opposite sides to the end parts which are connected to the chassis of the automobile and
a torsion beam according to any one of claims 1-2 or 3-16.

18. A torsion beam type suspension system which comprises
a pair of arm members which extend in a front-rear direction of an automobile and are designed to be connected at first end parts to a chassis of the automobile so as to be able to swing about pivot shafts in a top-bottom direction and to have wheels attached rotably at second end parts at opposite sides to the end parts which are connected to the chassis of the automobile,
coil springs which are arranged between said chassis and said arm members,
dampers which are arranged between said chassis and said arm members, and
a torsion beam according to any one of claims 1-2 or 3-16.

* * * * *